US011227113B2

(12) United States Patent
Beller et al.

(10) Patent No.: US 11,227,113 B2
(45) Date of Patent: Jan. 18, 2022

(54) PRECISION BATCH INTERACTION WITH A QUESTION ANSWERING SYSTEM

(71) Applicant: International Business Machines Corporation, Armonk, NY (US)

(72) Inventors: Charles Evan Beller, Baltimore, MD (US); William G Dubyak, Severna Park, MD (US); Palani Sakthi, Palatine, IL (US); Kristen Maria Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 15/001,848

(22) Filed: Jan. 20, 2016

(65) Prior Publication Data

US 2017/0206241 A1 Jul. 20, 2017

(51) Int. Cl.
| | | |
|---|---|---|
| *G06F 40/284* | (2020.01) | |
| *G06F 16/242* | (2019.01) | |
| *G06F 3/0482* | (2013.01) | |
| *G06F 40/205* | (2020.01) | |
| *G06F 16/33* | (2019.01) | |
| *G06F 16/9032* | (2019.01) | |
| *G06F 16/332* | (2019.01) | |

(52) U.S. Cl.
CPC .......... *G06F 40/284* (2020.01); *G06F 3/0482* (2013.01); *G06F 16/243* (2019.01); *G06F 16/3329* (2019.01); *G06F 16/3344* (2019.01); *G06F 16/90332* (2019.01); *G06F 40/205* (2020.01)

(58) Field of Classification Search
None
See application file for complete search history.

(56) References Cited

U.S. PATENT DOCUMENTS

| | | | | |
|---|---|---|---|---|
| 7,461,047 B2 * | 12/2008 | Masuichi | ............ | G06F 16/3338 706/62 |
| 7,765,227 B1 * | 7/2010 | Khoshnevisan | .... | G06F 16/9535 707/769 |
| 8,589,429 B1 * | 11/2013 | Thirumalai | ......... | G06F 16/2228 707/766 |
| 8,738,362 B2 * | 5/2014 | Ferrucci | .............. | G06F 16/3329 704/9 |
| 8,738,365 B2 * | 5/2014 | Ferrucci | ............ | G06F 16/24564 704/9 |
| 9,063,975 B2 | 6/2015 | Isensee et al. | | |
| 9,124,431 B2 * | 9/2015 | Schechter | ............. | G06F 40/247 |
| 9,342,600 B1 * | 5/2016 | Das | ........................ | G06F 16/951 |
| 10,007,730 B2 * | 6/2018 | Horvitz | .................. | G06F 16/951 |

(Continued)

*Primary Examiner* — Mariela Reyes
*Assistant Examiner* — Edward Jacobs
(74) *Attorney, Agent, or Firm* — Stephen R. Yoder

(57) ABSTRACT

Batch interaction with a computerized question answering system can produce an answer that more closely relates to a user's information need. A batch of questions can be generated interactively, and provides a context for a first question received from a user. The batch of questions includes or more additional questions which have terms with a nonsynonymous semantic relation to a first term in the first question. A question answering system can process the batch of questions to determine candidate answers. An answer to the first question can be determined based, at least in part, on a combined ranking of the candidate answers.

12 Claims, 5 Drawing Sheets

(56) References Cited

U.S. PATENT DOCUMENTS

| | | | |
|---|---|---|---|
| 2001/0000356 A1* | 4/2001 | Woods | G06F 16/31 |
| 2002/0169595 A1* | 11/2002 | Agichtein | G06F 40/211 704/9 |
| 2003/0041054 A1* | 2/2003 | Mao | G06F 16/951 |
| 2003/0216919 A1* | 11/2003 | Roushar | G06F 40/30 704/260 |
| 2003/0220913 A1* | 11/2003 | Doganata | G06F 16/9535 |
| 2005/0273318 A1* | 12/2005 | Zhou | G06F 16/3347 704/10 |
| 2005/0273812 A1* | 12/2005 | Sakai | H04N 21/4755 725/35 |
| 2006/0190425 A1* | 8/2006 | Chang | G06F 16/5838 |
| 2006/0235689 A1* | 10/2006 | Sugihara | G10L 15/1822 704/257 |
| 2006/0235860 A1* | 10/2006 | Brewer | G06F 16/951 |
| 2007/0011154 A1* | 1/2007 | Musgrove | G06F 40/30 |
| 2008/0215327 A1* | 9/2008 | Bennett | G10L 15/22 704/251 |
| 2008/0319962 A1* | 12/2008 | Riezler | G06F 16/3338 |
| 2009/0063473 A1* | 3/2009 | Van Den Berg | G06F 16/3344 |
| 2009/0070311 A1* | 3/2009 | Feng | G06F 16/3329 |
| 2009/0089277 A1* | 4/2009 | Cheslow | G06F 16/243 |
| 2009/0138454 A1* | 5/2009 | Rayner | G06F 16/313 |
| 2009/0240672 A1* | 9/2009 | Costello | G06Q 30/02 |
| 2009/0240685 A1* | 9/2009 | Costello | G06Q 30/0256 |
| 2009/0241066 A1* | 9/2009 | Costello | G06Q 30/0256 715/843 |
| 2009/0287678 A1* | 11/2009 | Brown | G06F 16/334 |
| 2009/0292687 A1* | 11/2009 | Fan | G06N 5/04 |
| 2010/0010803 A1* | 1/2010 | Ishikawa | G06F 40/247 704/9 |
| 2010/0023509 A1* | 1/2010 | Adachi | G06F 16/24534 707/E17.014 |
| 2010/0235164 A1* | 9/2010 | Todhunter | G06F 16/3329 704/9 |
| 2011/0040749 A1* | 2/2011 | Ceri | G06F 16/9535 707/723 |
| 2011/0078192 A1* | 3/2011 | Murdock, IV | G06F 16/3329 707/780 |
| 2011/0184718 A1* | 7/2011 | Chen | G06F 40/253 704/2 |
| 2011/0276560 A1* | 11/2011 | Costello | G06Q 30/0256 707/708 |
| 2012/0078891 A1* | 3/2012 | Brown | F16H 37/02 707/723 |
| 2012/0323906 A1* | 12/2012 | Fan | G09B 7/00 707/723 |
| 2012/0330882 A1* | 12/2012 | Ferrucci | G06N 7/005 706/52 |
| 2013/0006641 A1* | 1/2013 | Brown | G06F 16/3329 704/270.1 |
| 2013/0007055 A1* | 1/2013 | Brown | G06F 16/3344 707/769 |
| 2013/0013615 A1* | 1/2013 | Brown | G06F 16/2428 707/741 |
| 2013/0017523 A1* | 1/2013 | Barborak | G06N 5/04 434/322 |
| 2013/0035930 A1* | 2/2013 | Ferrucci | G06F 16/90332 704/9 |
| 2013/0054589 A1* | 2/2013 | Cheslow | G06F 16/3344 707/728 |
| 2014/0072948 A1* | 3/2014 | Boguraev | G09B 7/00 434/362 |
| 2014/0181136 A1* | 6/2014 | Johnson | G06F 16/285 707/768 |
| 2014/0258286 A1* | 9/2014 | Brown | G06F 16/3329 707/728 |
| 2014/0280087 A1* | 9/2014 | Isensee | G06F 16/3329 707/723 |
| 2014/0324825 A1* | 10/2014 | Gopinath | G06F 16/3338 707/722 |
| 2015/0006158 A1* | 1/2015 | Allen | G06F 16/3344 704/9 |
| 2015/0026163 A1 | 1/2015 | Haggar et al. | |
| 2015/0074095 A1* | 3/2015 | Enders | G06F 40/40 707/725 |
| 2015/0161241 A1* | 6/2015 | Haggar | G06F 16/3329 707/723 |
| 2015/0235131 A1 | 8/2015 | Allen et al. | |
| 2015/0261859 A1* | 9/2015 | Isensee | G06F 3/04842 707/723 |
| 2015/0339590 A1* | 11/2015 | Maarek | G06F 16/33 706/12 |
| 2017/0075877 A1* | 3/2017 | Lepeltier | G06F 40/205 |

\* cited by examiner

PRECISION BATCH INTERACTION WITH A QUESTION ANSWERING SYSTEM

GOVERNMENT LICENSE RIGHTS

This invention was made with government support under contract 2013-12101100008 awarded by the U.S. Department of Defense. The government has certain rights in the invention.

BACKGROUND

Embodiments of the inventive subject matter generally relate to the field of computers, and, more particularly, to precision batch interaction with a question answering system.

As computerized databases are internetworked, the amount of information available for retrieval has increased. To assist with searches for particular information, recent research has been directed to generating question answering (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question. The relevancy of the answer to a user's information need may depend on the context of the input question.

SUMMARY

Provided are techniques for batch interaction with a computerized question answering system. Using embodiments of this disclosure, a user device may interactively determine a batch of questions associated with a context for a first question. An answer to the first question may be determined using a combined ranking of candidate answers relevant to the batch of questions.

In one embodiment, a method comprises receiving, via a user device, a first question including at least a first term. One or more additional questions are presented, via the user device, and include other terms having a nonsynonymous semantic relation to the first term. A selection of at least a second question from the one or more additional questions is received via the user device. The first question and at least the second question are combined as a batch of questions. A question answering system determines candidate answers associated with the batch of questions. A first answer is determined based, at least in part, on a combined ranking of the candidate answers.

BRIEF DESCRIPTION OF THE DRAWINGS

The aspects of the disclosure may be better understood by those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although aspects of the disclosure are described in the context of a question answering system, the systems and methods may be applied to other systems that perform a search based on user parameters. In other instances, well-known instruction instances, protocols, structures and techniques have not been shown in detail in order not to obfuscate the description.

In various aspects of the disclosure, a QA system can search an information repository for answers to questions submitted via a user device. One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

When users submit questions to deep question answering systems, pertinent information is extracted from a question in order to generate a set of candidate answers. Generally, the "best" answer is the candidate answer that the deep QA system has the most confidence in, namely, the candidate answer having the highest confidence score. However, when a question may have ambiguous or unclear terms, the candidate answers may not be relevant to the user's information need. Often the intent a question may be understood by modifying terms of the question to determine a context of the input question. In this disclosure, a batch of questions can be generated to approximate the user's information need. The batch of questions can be processed for candidate answers. A combined ranking using an intersection of the candidate answer sets, as well as weighting based on confidence score, can be used to determine a "best" answer to the user's information need.

Figure 1:
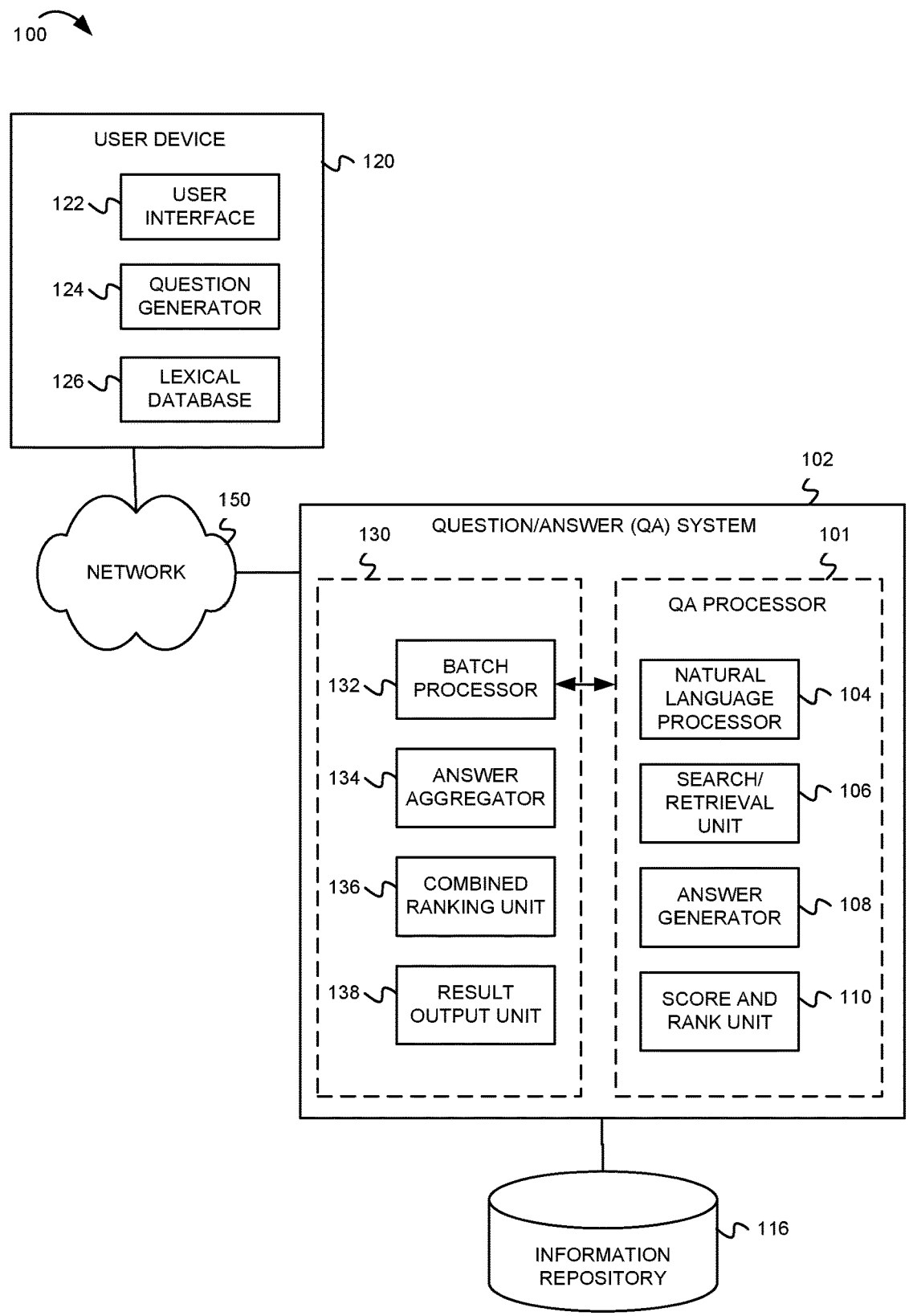
FIG. 1 is a block diagram of a system including a user device and a QA system in accordance with an embodiment of this disclosure.

FIG. 1 is a block diagram of a system 100 that includes example components for describing batch interaction with a QA system. The system 100 includes a QA system 102, an information repository 116 and a user device 120. QA system 102 may be communicably coupled with a user device 120 and with one or more information repositories via a network 150. Network 150 may be any type of network or collection of networks, including local area networks, metropolitan area networks, personal area networks, intranets. In some aspects, network 150 may be the Internet.

The user device 120 includes a user interface 122, question generator 124, and a lexical database 126. The user interface 122 may be any form of user interface, including, but not limited to, a display, keyboard, mouse, touchscreen, microphone, or an external user interface coupled by a wired or wireless connection to the user device 120. The user interface 122 is capable of receiving a first question from a user.

The question generator 124 is configured to generate one or more additional questions based, at least in part, on the first question. While the first question may have a first term, the one or more additional questions may have other terms having a nonsynonymous semantic relation to the first term. For example, the other terms may be hypernyms, hyponyms, metonyms, or the like, of the first term. The other terms can be determined by referring to the lexical database 126. The lexical database 126 may comprise one or more semantic relationships between words. Examples of lexical databases include a hierarchical taxonomy, a gazetteer, and a semantic relationship database storing super-subordinate relationships between pluralities of terms. One example of a semantic relationship database is WordNet®, which is maintained by Princeton University. Although illustrated at the user device 120, the question generator 124 and lexical database 126 may be located elsewhere and communicatively coupled to the user device 120 via the network 150. For example, question generator 124 and lexical database 126 may be located in the QA system 102 or in another server different from the user device 120 and QA system 102.

The one or more additional questions generated by question generator 124 can be presented by the user interface 122 to allow a user to select from the one or more additional questions. For example, a user may select a second question from the additional questions. By receiving the selection of an additional question, a batch of questions can be formed. For example, the first question and the second question can be combined as a batch of questions sent to the QA system 102. Because the user has been involved in the selection of questions to include in the batch of questions, the batch of questions can approximate the user's information need and provide a context for the answer sought.

The batch of questions is sent to a batch interaction front end 130. Batch interaction front end 130 may be located at the QA system 102, as illustrated in FIG. 1, or may be located elsewhere. In one embodiment, the batch interaction front end 130 may be located at the user device 120 or another server different from the QA system 102 and user device 120. The batch interaction front end 130 includes a batch processor 132, an answer aggregator 134, a combined ranking unit 136, and a result output unit 138. The batch processor 132 is configured to send each of the batch of questions to a QA processor 101 of the QA system 102. For example, each question in the batch may be sent individually as an input question to the QA processor 101.

QA processor 101 can receive an input question from the batch processor 132 and process the question to determine answers to the input question. In some aspects, an input question submitted to the QA processor 101 is processed as part of a pipeline that includes a natural language processor 104, a search retrieval unit 106, an answer generator 108, and a score and rank unit 110. Natural language processor 104 receives an input question in a natural language format and parses the question to identify entities and concepts in the question. For example, a user may input the question "who was president when Pearl Harbor was bombed?" The natural language processor 104 analyzes the question to identify the entities and concepts in the question. Search retrieval unit 106 uses the entities and concepts identified by natural language processor 104 to generate one or more queries. The queries are executed against the documents in the information repository 116.

Information repository 116 comprises any type of information which may be searched by the QA system 102. In one embodiment, the information repository 116 comprises a collection of documents, such as files, database objects, or other data containers that include text that may be used to answer questions posed to the QA system 102. The content may be primarily textual in nature, as in the case of electronic journal articles. While the primary content in the document may be textual in nature, a document may include other forms of content having associated text. For example, a document may have primarily graphical content, with metadata in text form that describes the graphical content.

The queries executed by the search retrieval unit 106 can return a results set of documents that match the query terms. Answer generator 108 analyzes the documents in the results set and suggests text from the documents in the results set that may be used as candidate answers to the input question. Score and rank unit 110 determines a score for the candidate answers, and ranks the candidate answers by the determined score. In some aspects, separate scores may be determined based on how well a potential answer matches the entities in the question, the concepts in the question, and the context of the question. The separate scores may be optionally weighted and combined to produce an overall score. The overall score can then be used to rank the candidate answers. Candidate answers for each input question can be returned by the QA processor 101 to the batch processor 132 for further processing by the batch interaction front end 130.

Figure 3:
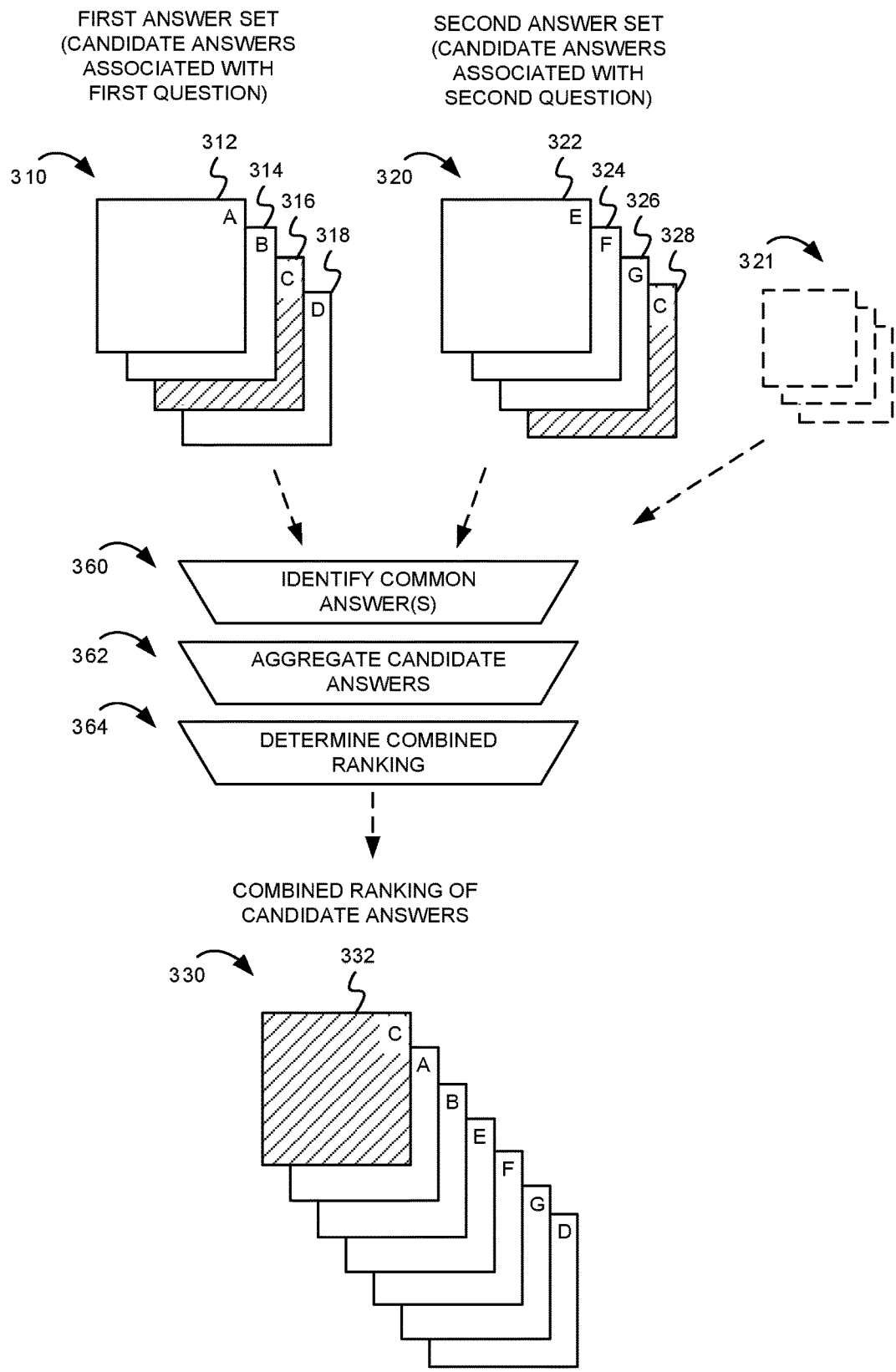
FIG. 3 is an example combined ranking of candidate answers in accordance with an embodiment of this disclosure.

The answer aggregator 134 is configured to aggregate the candidate answers from multiple questions. Intersections in the sets of candidate answers are identified so that duplicates are noted and removed from the aggregation of candidate answers. However, when a candidate answer is included in the answer sets for more than one question, that candidate answer may be more likely to be correct for the user's information need. A combined ranking unit 136 ranks the aggregated answers and determines a combined ranking of candidate answers. Answers appearing in more than one answer set may receiving a higher ranking. FIG. 3 describes several algorithms which may be used to determine a combined ranking of candidate answers as a result of processing the batch of questions.

The result output unit 138 is configured to determine an answer to the batch of questions based on the combined ranking. For example, the top ranking answer (or answers, if multiple results are provided) can then be returned in response to the batch of questions.

Further details on the operation of system 100 are provided below with respect to FIGS. 2-4.

Figure 2:
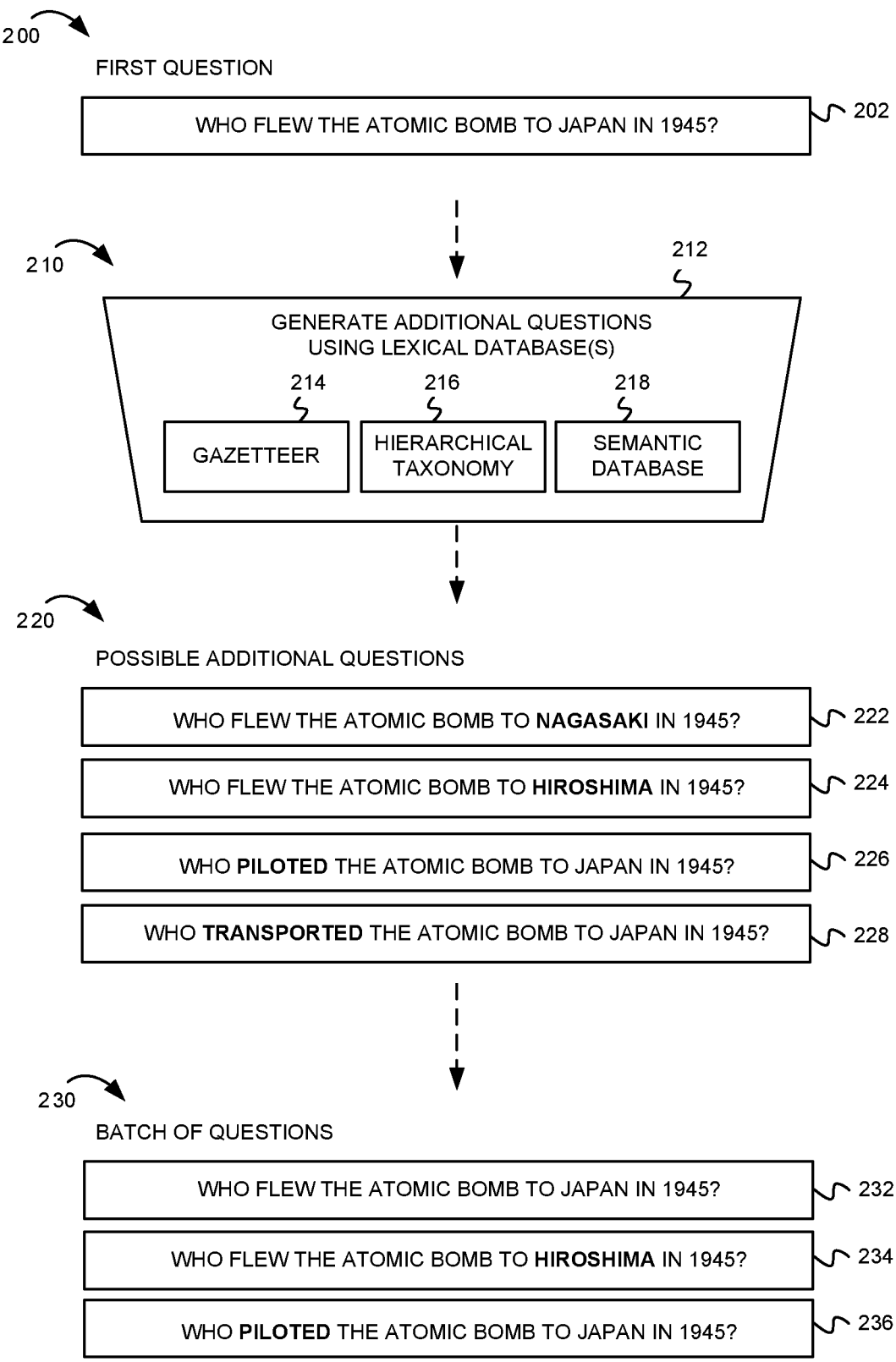
FIG. 2 is an illustration of an example batch of questions in accordance with an embodiment of this disclosure.

FIG. 2 is an illustration of an example batch of questions. The illustration shows a first question 202 is received 200 and be processed 210 to present one or more possible additional questions 220. Based on user interaction, selection of additional questions can be added with the first question 202 to create a batch of questions 230.

In the example, a first question 202 ("Who flew the atomic bomb to Japan in 1945?") is received via a user interface. The question may have nuanced interpretations which could result in an answer that isn't relevant to the user's information need. For example, the user may intend to learn which army flew the atomic bomb, which pilot, which plane. Furthermore, there were two atomic bombs flown to Japan in 1945, and the user may intend to learn about one of them.

Because of the various interpretations and aspects of the question, an answer generated by the QA system may not reliably have relevance to the user's information need.

Using the techniques in this disclosure, the user device may present possible additional questions prior to sending a batch of questions to the QA system. It should be understood that the additional questions can be determined before attempting to find an answer or answers to the first question. The first question can be processed 210 (e.g., by a question generator, such as question generator 124) to generate additional questions using a lexical database (or multiple databases). Three examples are described here, although other examples of lexical databases can be readily conceived within the scope of this disclosure.

A gazetteer 214 is a geographical index or dictionary which can include information, such as relationships, regarding locations. For example, the gazetteer 214 may be used to identify city names in the country (e.g., "Nagasaki" and "Hiroshima" are cities in "Japan"). By traversing up or down in a gazetteer, the question generator can replace one term in the first question 202 with another term that is more specific or more general to the replaced term. For example, in questions 222, 224, the term "Japan" can be replaced with the terms "Nagasaki" or "Hiroshima," respectively. It should be understood that other additional questions may be generated using the gazetteer, but are not included in FIG. 2 for the sake of brevity.

A hierarchical taxonomy 216 is another example of a lexical database. A taxonomy is a classification system which groups concepts into a structure, such as species, subspecies, etc. In a hierarchical taxonomy, the concepts are organized in hierarchically such that one parent concept (e.g. genus) can have multiple child concepts (e.g., species), and so on. In the field of biology, a species can be identified by a taxonomy that includes several hierarchical ranks (e.g., domain, kingdom, phylum, class, order, family, genus, species, and subspecies). In the present disclosure, any form of hierarchical taxonomy may be used to maintain relationships between words in a classification. By traversing up or down from a first term in the hierarchical taxonomy 216, the question generator may identify a broader term or more specific terms that are related to the first term.

Another example of a lexical database is a semantic database. A semantic database can maintain relationships between two or more words based on the meaning of the words. For example, a hypernym is a superordinate (e.g., broader) term, while a hyponym is a subordinate (e.g., more specific) term (hyponym is also sometimes referred to as a troponym). A metonym is a word that is related by nearness in space or time (for example, "mandible" is a metonym of "cheek"). It should be noted that the semantic relationships described thus far are nonsynonymous semantic relationships. Synonyms are words that have the same meaning. In the present disclosure, nonsynonymous terms are used because the goal is to determine a meaning that may be ambiguous from the original term. In the example of FIG. 2, the term "flew" may have different interpretations even within the context of the first question 202. Other terms having a nonsynonymous semantic relationship to the word "flew" may be determined using the semantic database 218. For example, "flew" may refer to a person, such as a pilot, or may refer to a carrier, such as a transporter. In FIG. 2, the question generator may replace the term "flew" with "piloted" and "transported" to generate additional questions 226, 228, respectively.

The additional questions 220 may be presented to the user such that the user can select one or more of the possible additional questions. Based on the selection(s) by the user, a context for the first question 202 can be determined. The selected question (in this example, questions 234 and 236) can be included with the first question (232) to prepare a batch of questions 230.

By reviewing the first question 202 as submitted and the resulting batch of questions 230, one can see that the batch of questions will result in a more precise answer relevant to the user's information need. While the original intent of the first question 202 may be the same, the first question 202 may result in a variety of non-relevant answers. For example, was the user expecting the answer to be "the United States" (commanded the atomic bomb to Japan), "Paul Tibbets" (piloted the atomic bomb to Hiroshima), "Charles Sweeney" (piloted the atomic bomb to Nagasaki), the "Enola Gay" (name of the plane that flew the "Little Boy" atomic bomb to Japan), or the "Bockscar" (name of the plane that flew the "Fat Man" atomic bomb to Nagasaki). The QA system cannot confidently provide a result to the first question that is relevant to the intent because the first question may have several correct (but non-relevant) answers.

Conversely, by processing the batch of questions 230, and ranking the combined answer sets for the batch of questions, the QA system may provide the correct answer ("Paul Tibbets") that matches the user's initial intent.

Furthermore, in one embodiment, the user interaction to prepare the batch of questions can occur without having to process the first question through a QA system's question processor. In other words, the QA processor (such as QA processor 101) is not needed to determine the batch of questions, saving time and processor power from searching the information repository 116. Furthermore, it is not necessary to generate a set of predefined questions or lexical phrases that beg the same answer. Instead, the lexical database can be consulted to propose semantic changes to one or more terms in the first question. The semantic changes can result in a batch of questions that relate to the same information need but with varying specificity or breadth.

In accordance with an embodiment of this disclosure, the answer sets from the batch of questions must be aggregated and a combined ranking determined. The combined ranking may take into account, for example, the number of times a candidate answer is returned for the batch of questions. Even though an answer in one answer set has a higher confidence score, if a common answer appears in more than one answer set, the common answer may be closely related to the intent of the user's information need. Therefore, a weighting of the candidate answers may be based on a number of questions for which each candidate answer is associated. In one embodiment, a candidate answer which is associated with fewer than a threshold number of questions may be discarded. In another embodiment, average scores for the candidate answers may be an average of a first score for a particular candidate answer in a first answer set and a second score for the same particular candidate answer in a second answer set.

FIG. 3 is an example combined ranking of candidate answers. In the example of FIG. 3, only two answer sets will be described in detail. However, the quantity of answer sets may correspond to the number of questions included in the batch of questions submitted to the batch interaction front end 130.

A first answer set 310 includes candidate answers associated with the first question in the batch of questions. The second answer set 320 includes candidate answers associated with the second question in the batch of questions. Although not described in detail, the batch of questions may include more than two questions, and further answer sets 321 may be included in the combined ranking.

The first answer set 310 includes candidate answers 312, 314, 316, 318 (referred to as documents A, B, C, D, respectively), which have been illustrated conceptually has having a higher score for document A compared to a lower score for document B, and so on to the lowest scoring document D. Similarly, the second answer set 320 includes candidate answers 322, 324, 326, 328 (referred to as documents E, F, G, and C, respectively), ordered by relative scores within the answer set. Note that document C (candidate answer 316 in the first answer set 310 and candidate answer 328 in the second answer set 320) is the same answer. Furthermore, although document C is not the highest scoring in either of the answer set, it may be the highest ranking answer when the answer sets are combined and ranked.

The batch interaction front end 130 may aggregate and rank the answer sets. For example, the answer aggregator 134 may be used to identify common answers (shown at 360). Common answers may be included in the combined ranking only once, but may be weighted higher based on the number of answer sets in which the common answer appears. The candidate answers from the answer sets may be aggregated to make one list of candidate answers (shown at 362). A calculation may be performed to determine a combined ranking of the candidate answers (shown at 364). The processes at 360, 362, and 364 may be performed in a different order as shown and may utilize different algorithms in different embodiments. The result of the processes is a combined ranking of candidate answers 330.

In the example of FIG. 3, the document C (candidate answer 332 in the combined ranking of candidate answers 330) has the first rank. The result output unit 138 may select candidate answer 332 to output to the user device 120. In some embodiments the QA system may provide more than one answer, and may optionally include confidence scores or weighted combined rankings based on the combined ranking of candidate answers 330.

A combined ranking may be the result of an algorithm to calculate a weighted score or rank. Several examples are described below using mathematical formulas. The formulas are provided only for example purposes and not intended to limit the scope of the example algorithms they describe.

In one example, a combined score is derived based on the score(s) for an answer in the various answer sets. For a candidate answer a, let count(a) represent the number of questions for which answer a is identified in the several answer sets. Let Score(a,i) represent the score of answer a for question i. Score(a,i)=0 if the answer a is not an answer for question i. A weighting factor $\alpha$ can optionally be used. The value of $\alpha$ may be manually configured or derived statistically. A combined score for each candidate answer may be represented as:

$$Combined_{score(a)} = \alpha(count(a)) \times max_i(score(a,i))$$

The combined score can be calculated for each candidate answer in the aggregation. The combined ranking can be based on the combined score, from highest score to lowest score.

In a variation of the previous example, rather than using a maximum score (e.g., $max_i(Score(a,i))$, instead an average of the individual scores on the questions for which answer a is a candidate answer may be used. Letting n represent the number of questions in the batch, the combined score may be calculated as:

$$Combined_{score\ (a)} = \alpha(count(a)) \times \sum_{i=1}^{n} Score(a, i) / count\ (a)$$

In another variation, only candidate answers that occur in response to at least a threshold percentage $\beta$ (or quantity) of questions can be included in the aggregated answer set. Either maximum individual score or average individual score could be used to calculate the combined score.

Using maximum individual score:

$$Combined_{score(a)} = \begin{cases} max_i(Score(a, i)), & \text{if } count(a) \geq \beta \\ 0, & \text{if } count(a) < \beta \end{cases}$$

Using average individual score:

$$Combined_{score(a)} = \begin{cases} \dfrac{\sum_{i=1}^{n} Score(a, i)}{count(a)}, & \text{if } count(a) \geq \beta \\ 0, & \text{if } count(a) < \beta \end{cases}$$

In another embodiment, the rankings from each candidate set may be used rather than scores. For example, a sum of the reciprocals of the candidate answer rankings may result in a combined score for an answer. Letting rank(a,i) represent the rank of candidate answer a for question i, where a is an identified candidate answer for the question, ranging from 1 for the top-scored candidate for the question i to the cardinality of the candidate answer set for the question, the combined score may be calculated as:

$$Combined_{score(a)} = \sum_{i=0}^{n} \begin{cases} \dfrac{1}{rank(a, i)} & \text{if } a \text{ is a candidate answer for question } i \\ 0 & \text{if } a \text{ is not a candidate answer for question } i \end{cases}$$

In the cases that use averages, these averages may also be calculated considering only up to the top $\gamma$ scores. As with a in the simplest calculation, both $\beta$ and $\gamma$ may either be manually configured or derived statistically from a training set of questions with ground truth answers. The combined ranking orders the candidate answers by their calculated combined scores.

Figure 4:
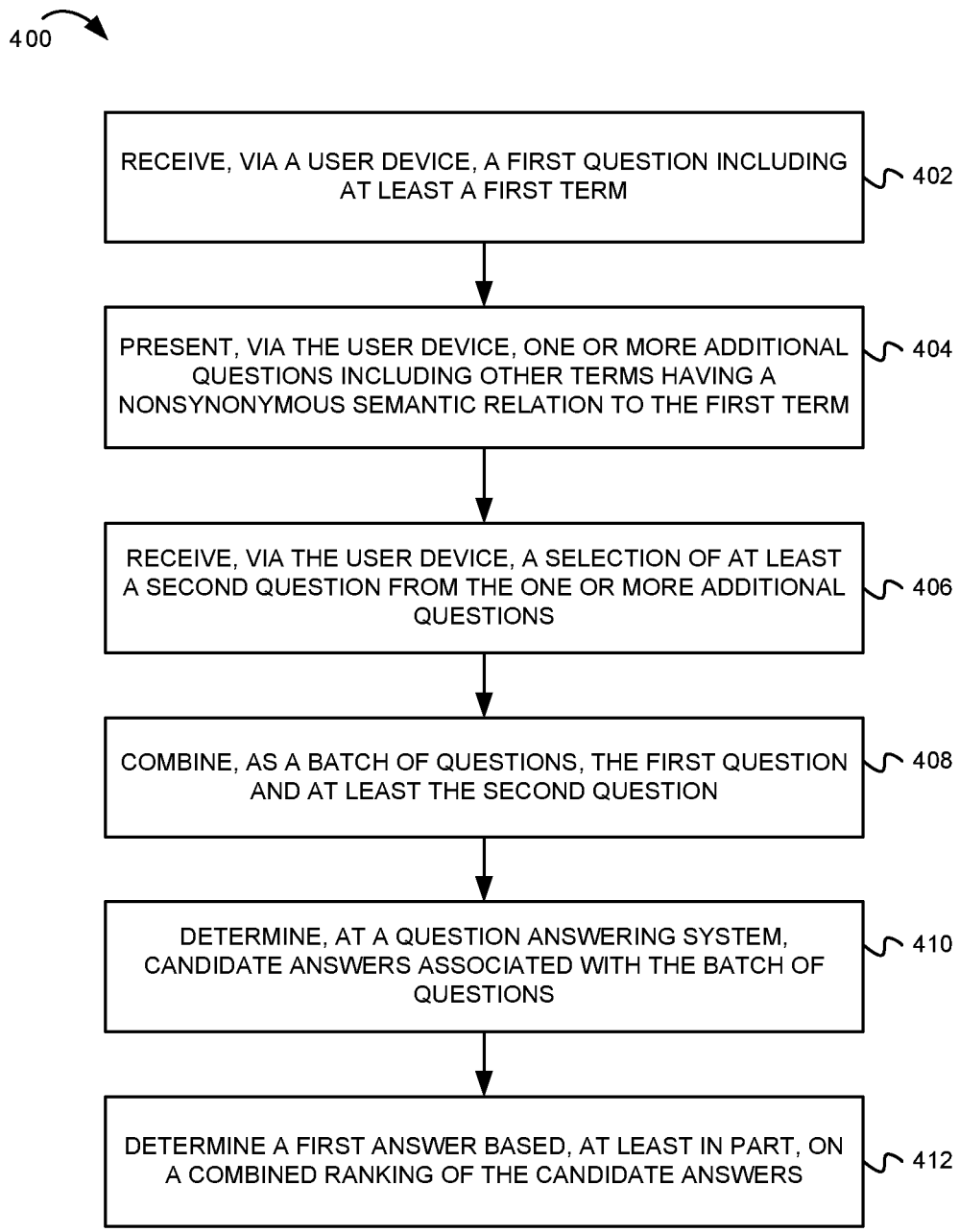
FIG. 4 is a flow chart illustrating example operations of precision batch interaction with a QA system in accordance with an embodiment of this disclosure.

FIG. 4 is a flow chart 400 illustrating example operations for precision batch interaction with a QA system in accordance with an embodiment of this disclosure. The flow chart 400 begins at block 402.

At block 402, a system receives, via a user device, a first question including at least a first term. At block 404, the system presents, via the user device, one or more additional questions including other terms having a nonsynonymous semantic relation to the first term. At block 406, the system receives, via the user device, a selection of at least a second question from the one or more additional questions. At block 408, the system combines, as a batch of questions, the first question and at least the second question. At block 410, the system determines, at a question answering system, candidate answers associated with the batch of questions. At block 412, the system determines a first answer based, at least in part, on a combined ranking of the candidate answers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
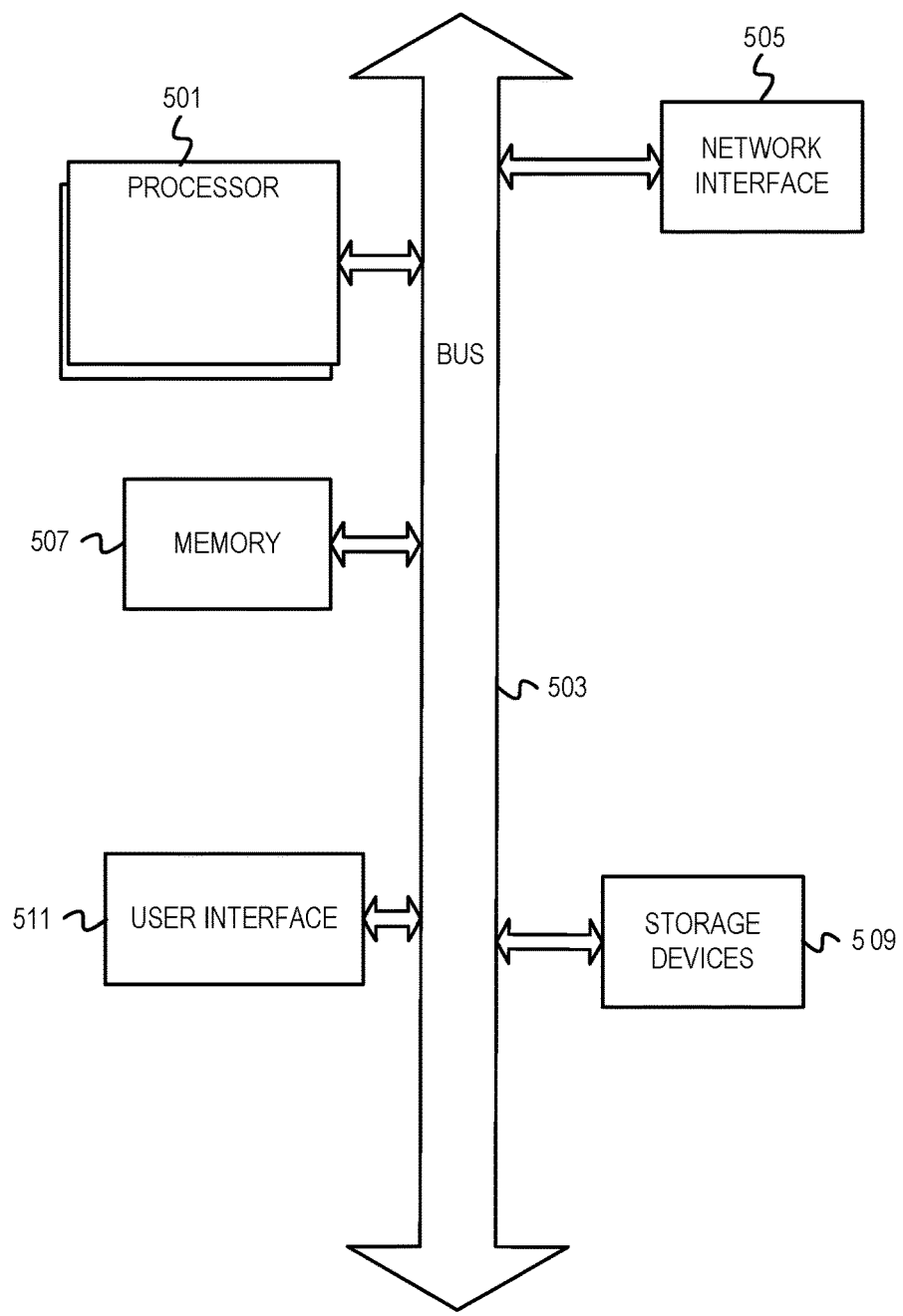
FIG. 5 depicts an example computer system for use as a user device or QA system in accordance with embodiments of this disclosure.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that facilitate precision batch interaction with a QA system. For example, the system memory 507 may include instructions which, when executed by the processor unit 501, cause the computer system to perform any of the functionality described in FIGS. 1-4. Any one of these functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for precision batch interaction with a QA system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for use with a computerized question answering system, the method comprising:
   receiving, via a user device, a first question composed of constituent parts including at least a question word, a verb, and an object of the verb;
   providing, via the user device, a plurality of additional questions generated by replacing the verb or the object of the verb with at least a first term and a second term, the first term having a nonsynonymous semantic relation to the verb and the second term having a hierarchical relationship to the object of the verb;
   receiving, via the user device, a selection of at least a second question from the plurality of additional questions;
   generating a batch of questions including the first question and at least the second question;
   sending the batch of questions to a question answering system; and
   receiving, from the question answering system, a candidate answer assigned a highest confidence score among possible answers to the batch of questions, the confidence scores taking into account a weighted rank for common answers responsive to individual questions in the batch of questions.

2. The method of claim 1, wherein providing the plurality of additional questions comprises:
   determining, at the user device, the second term from a hierarchical taxonomy establishing relationships between words in a classification including the object of the verb.

3. The method of claim 2, further comprising:
   determining, at the user device, the first term occurs from a lexical database that is in a different server device from the server device of the question answering system.

4. The method of claim 2, wherein the plurality of additional questions are composed of constituent parts including at least a lexical answer type (LAT), a verb, and an object of the verb.

5. A system, comprising:
   a processor; and
   memory having instructions stored therein which, when executed by the processor of a user device, cause the user device to:
      receive, via the user device, a first question composed of constituent parts including at least a question word, a verb, and an object of the verb;
      provide, via the user device, a plurality of additional questions generated by replacing the verb or the object of the verb with at least a first term and a second term, the first term having a nonsynonymous semantic relation to the verb and the second term having a hierarchical relationship to the object of the verb;
      receive, via the user device, a selection of at least a second question from the plurality of additional questions;
      generate a batch of questions including the first question and at least the second question;
      send the batch of questions to a question answering system; and
      receive, from the question answering system, a candidate answer assigned a highest confidence score among possible answers to the batch of questions, the confidence scores taking into account a weighted rank for common answers responsive to individual questions in the batch of questions.

6. The system of claim 5, wherein the instructions, when executed by the processor, cause the user device to:
   determine the second term from a hierarchical taxonomy establishing relationships between words in a classification including the object of the verb.

7. The system of claim 5, wherein the instructions, when executed by the processor, cause the user device to:
   determine the first term occurs from a lexical database that is in a different server device from the server device of the question answering system.

8. A method performed by a question answering system, the method comprising:
   receiving a first query including a first question and a second question from a user device communicatively coupled to the question answering system, wherein the first question is composed of constituent parts including at least a question word, a verb, and an object of the verb and the second question includes a first term having a nonsynonymous semantic relation to the verb and a second term having a hierarchical relationship to the object of the verb;
   determining, at the question answering system, candidate answers associated with individual questions in the first query;
   determining, at the question answering system, a candidate answer assigned a highest confidence score among possible answers to the first query, the highest confidence score taking into account a weighted rank for common answers associated with individual questions in the first query; and
   sending the candidate answer to the user device in response to the first query.

9. The method of claim 8, wherein determining the candidate answers comprises:
   determining confidence scores for the candidate answers in a first answer set associated with the first question;
   determining confidence scores for the candidate answers in a second answer set associated with the second question;
   aggregating the first answer set and the second answer set as aggregated set of answers; and
   determining individual rankings of the aggregated set of answers based on confidence scores for the aggregated set of answers taking into account the weighted rank for common answers within the aggregated set of answers.

10. The method of claim 9, wherein determining the individual rankings comprises:
    discarding a candidate answer from the aggregated set of answers that is associated with fewer than a threshold number of questions in the batch of questions.

11. The method of claim 9, wherein determining the individual rankings comprises:
    determining average confidence scores for the candidate answers from the aggregated set of answers, wherein an average confidence score for a first candidate answer is an average of a first confidence score for the first candidate answer associated with the first question and a second confidence score for the first candidate answer associated with the second question.

12. The method of claim 1, further comprising:
    determining a first set of candidate answers to the first question;
    determining a second set of candidate answers to the second question;
    aggregating the first set of candidate answers and the second set of candidate answers into a set of aggregated answers; and
    identifying duplicate answers within the set of aggregated answers;
    wherein:
    receiving a candidate answer includes generating a set of confidence scores for the set of aggregated answers by increasing a baseline confidence score according to how many times an aggregated answer is duplicated.

\* \* \* \* \*